United States Patent [19]

Herr

[11] 3,812,302

[45] May 21, 1974

[54] TEST DESK INCLUDING A MANUALLY CONTROLLED CONNECT MATRIX

[75] Inventor: Kurt F. Herr, Woodridge, Ill.

[73] Assignee: GTE Automatic Electric Laboratories Incorporated, Northlake, Ill.

[22] Filed: Apr. 6, 1973

[21] Appl. No.: 348,561

[52] U.S. Cl....179/175.2 R, 179/175.1 R, 340/166 R

[51] Int. Cl. ........................................... H04m 3/26

[58] Field of Search...179/175.1 R, 175.11, 175.2 R, 179/15 W; 340/166 R

[56] References Cited

UNITED STATES PATENTS

| | | | |
|---|---|---|---|
| 2,617,897 | 11/1952 | Kessler | 179/175.2 R |
| 3,456,084 | 7/1969 | Haselton | 340/166 R |
| 3,470,533 | 9/1969 | Tanner et al. | 179/1 SW |

*Primary Examiner*—Kathleen H. Claffy
*Assistant Examiner*—Douglas W. Olms
*Attorney, Agent, or Firm*—Bernard E. Franz

[57] ABSTRACT

A test desk is equipped with pushbutton controls and a manually controlled connect matrix for establishing connections between any one of a number of test circuits and any one of a number of test trunks. Provisions are included for preventing double or multiple connections, as well as for tracing connections.

9 Claims, 7 Drawing Figures

TEST DESK INCLUDING A MANUALLY CONTROLLED CONNECT MATRIX

This invention relates to an improved test desk for use in a central office switching system and, more particularly, to a manually controlled connect matrix for such a test desk for establishing connections between any one of a number of test trunks and test circuits.

CROSS-REFERENCES TO RELATED APPLICATIONS

The preferred embodiment of the invention is incorporated in a PROCESSOR CONTROLLED COMMUNICATION SWITCHING SYSTEM, U.S. Pat. application Ser. No. 130,133, now abandoned filed Apr. 1, 1971, by K. E. Prescher, R. E. Schauer and F. B. Sikorski, and a continuation-in-part thereof Ser. No. 342,323 filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. Pat. application Ser. No. 139,480, filed May 3, 1971, now U.S. Pat. No. 3,729,715 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851, filed Nov. 24, 1971, now U.S. Pat. No. 3,737,873 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909, now U.S. Pat. No. 3,784,801 by J. P. Caputo and F. A. Weber for a DATA HANDLING SYSTEM ERROR AND FAULT DETECTING AND DISCRIMINATING MAINTENANCE ARRANGEMENT, Ser. No. 270,910, now Pat. No. 3,783,255 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916, now U.S. Pat. No. 3,783,256 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in U.S. Pat. No. 3,681,537, issued Aug. 1, 1972, by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972, by J. W. Eddy for a MARKER PATH FINDING ARRANGEMENT INCLUDING IMMEDIATE RING; and also in U.S. Pat. applications Ser. No. 281,586, filed Aug. 17, 1972, by J. W. Eddy for an INTERLOCK ARRANGEMENT FOR A COMMUNICATION SWITCHING SYSTEM, Ser. No. 311,606, filed Dec. 4, 1972, by J. W. Eddy and S. E. Puccini for a COMMUNICATION SYSTEM CONTROL TRANSFER ARRANGEMENT, Ser. No. 303,157, filed Nov. 2, 1972, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. Pat. application Ser. No. 320,412, filed Jan. 2, 1973, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The above system, register-sender, marker and communication register patents and applications are incorporated herein and made a part hereof as though fully set forth.

BACKGROUND AND SUMMARY OF THE INVENTION

A test desk within a central office switching system generally consists of test equipment such as a volt/ohm/milli-ampere meter, a dial speed and percent make/break test unit, a howler, an insulation breakdown test unit, and a sounder, to mention but a few of the various different types. In addition, the test desk has a control panel which allows control of the application, configuration, sensitivity and range of this test equipment, and a jack panel with test trunk appearances such as inspector trunks, permanent trunks, tollboard trunks, lines to MDF, and the like. In the past, these test desks also included a cord and jack arrangement which permit any piece of test equipment to be connected to any type of test trunk appearing on the jack panel.

To establish a connection, a test man would simply pick the plug and associated test cord, and plug it into a jack to connect the selected piece of test equipment to the desired test trunk. With such an arrangement, double connections are no problem, since once a jack is occupied by a plug, the test man could not insert another plug into the same jack. Tracing to determine what connections are established is performed simply by following the associated test cords. Also, the availability of a test trunk could be determined simply by checking whether its associated jack is occupied by a plug.

In the above-mentioned PROCESSOR CONTROLLED COMMUNICATION SWITCHING SYSTEM, the test desk is equipped with pushbutton controls and a manually controlled connect matrix for establishing these connections, in replacement of the plug and jack arrangement. The present invention is particularly concerned with the manual control of the connect matrix, for establishing the connections through it, for preventing double connections, and for providing a tracing function, since a number of connections can be established through the connect matrix. The arrangement also eliminates the need of a costly marker to control the connect matrix.

Accordingly, it is an object of the present invention to provide an improved pushbutton test desk.

In this respect, it is a further object to provide an improved test desk equipped with pushbutton controls and a manually controlled connect matrix for establishing connections, in replacement of a plug and jack arrangement.

A further object is to provide a pushbutton test desk having provisions for preventing double connections from being established, and for providing a tracing function.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE PREFERRED EMBODIMENT

Figure 1:
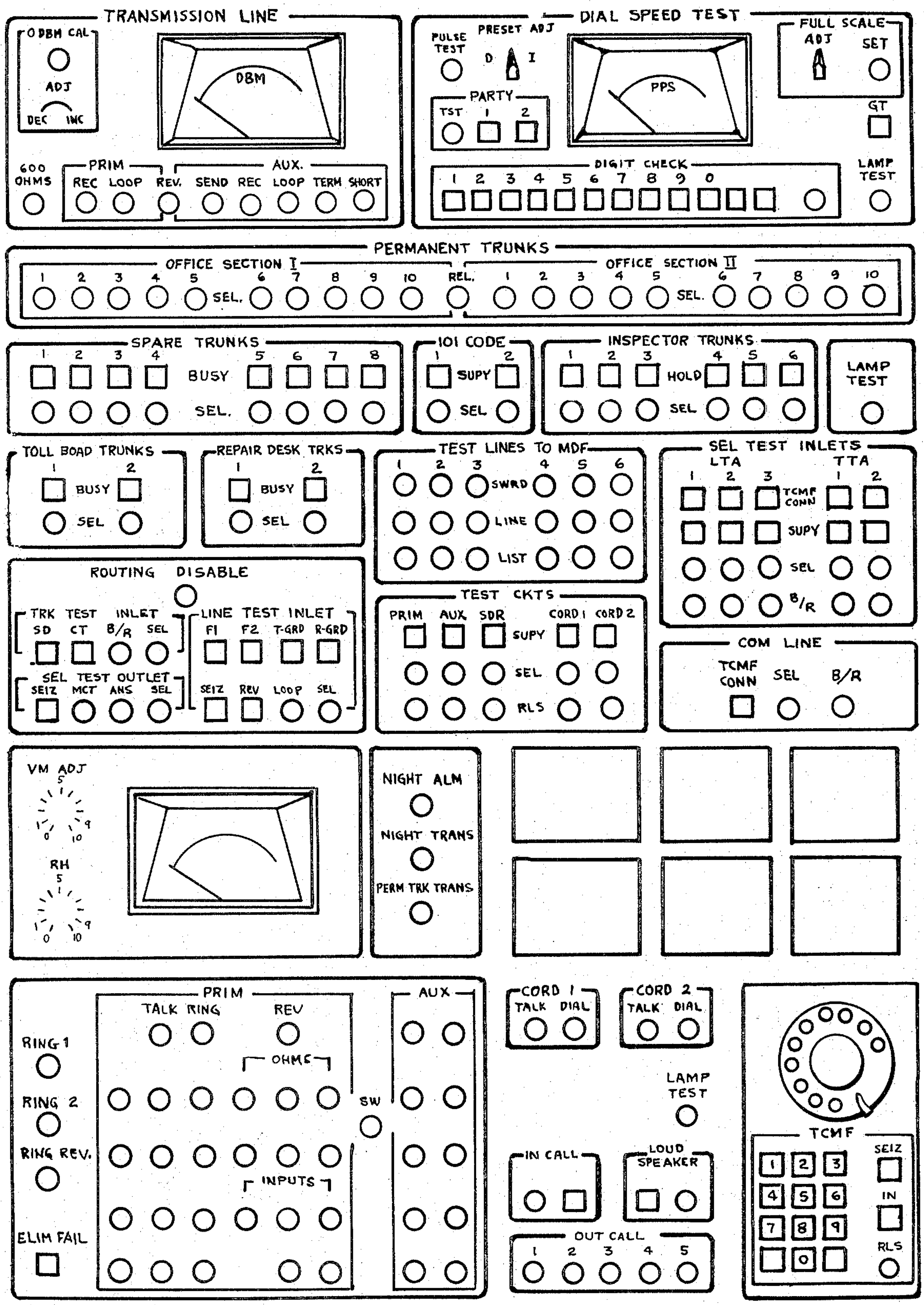
FIG. 1 is a front plan view of the pushbutton test desk.
Figure 2A:
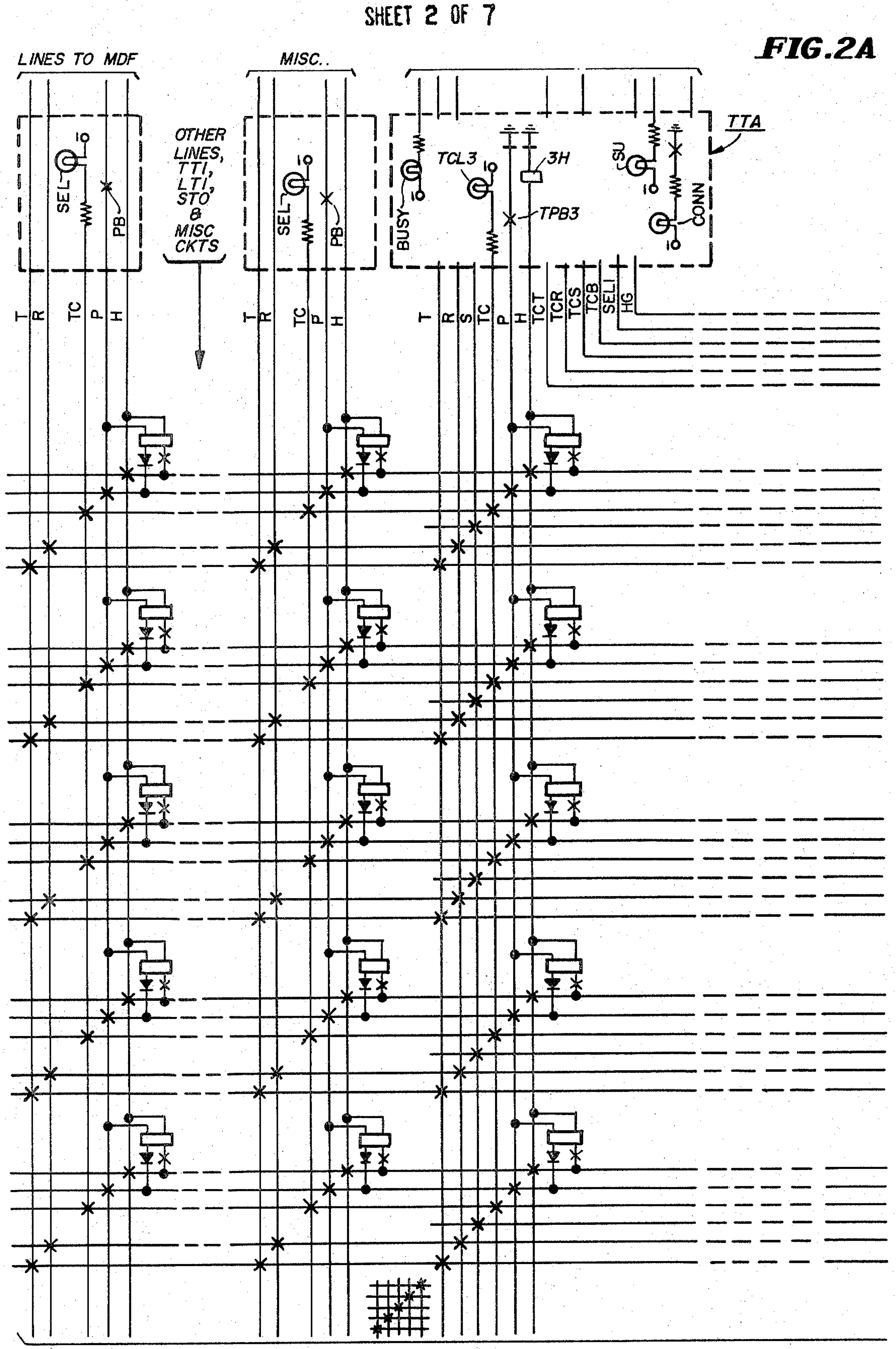
FIGS. 2A and 2B are schematics illustrating the manually controlled connect matrix.
Figure 2B:
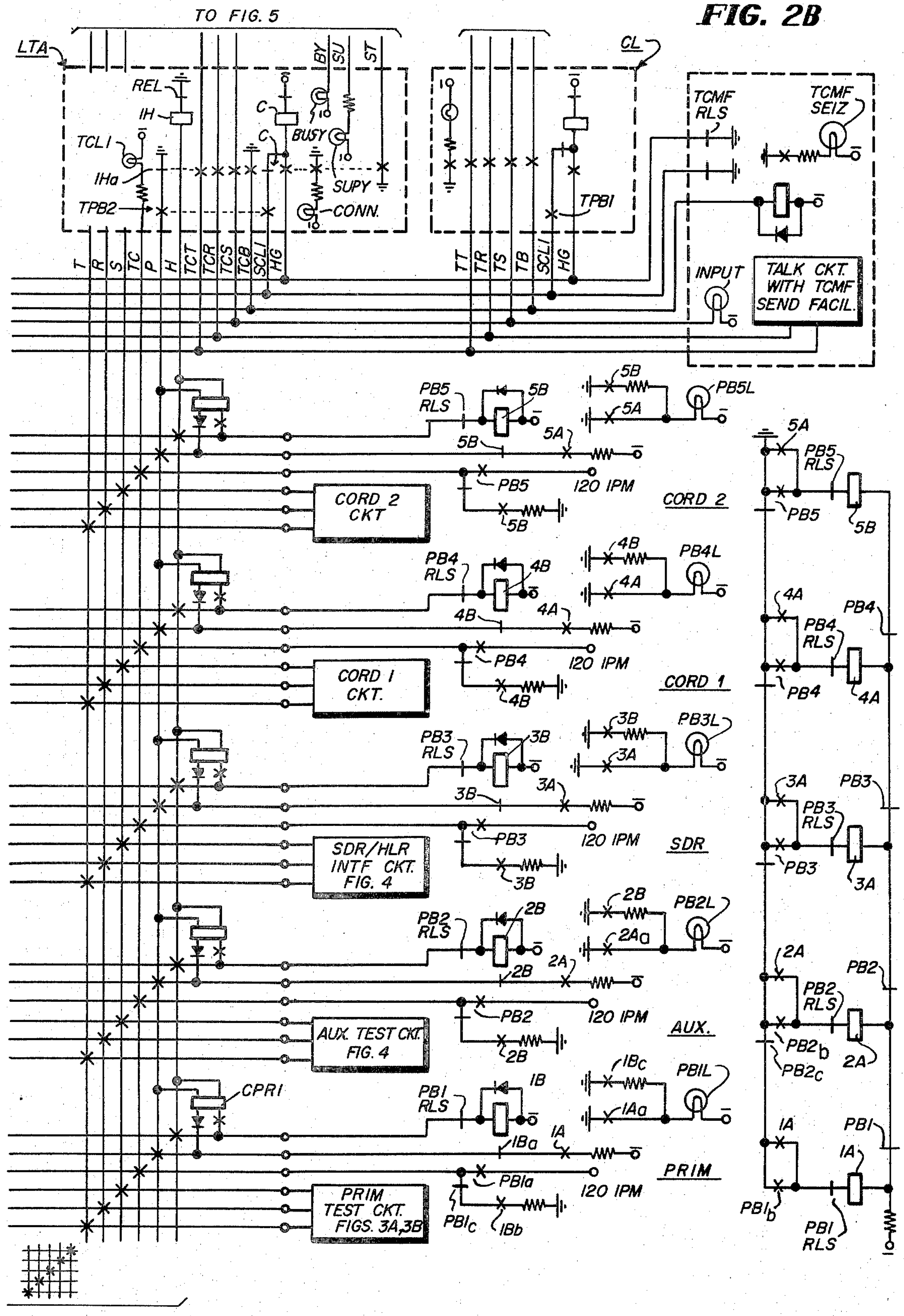

Referring now to the drawings, in FIGS. 1 and 2 there are illustrated the front panel of an exemplary pushbutton test desk and the manually controlled connect matrix, for establishing a connection between a test facility and a test trunk. As can be seen in FIG. 1, the front panel has thereon a number of pushbuttons, indicator lamps, meters, sensitivity controls and the like, for establishing such a connection and for initiating various tests, in the manner described more fully below.

In FIG. 2, a portion of an exemplary connect matrix is illustrated, and it can be seen to be a typical crosspoint relay matrix, with pull leads (P-leads) for the initial pulling of the matrix crosspoint relays and hold leads (H-leads) for holding a matrix crosspoint relay after it has been operated. The connect matrix is not limited in size, with the one illustrated having five inlets for test circuits and four outlets for test trunks (the same being only a partial illustration for the purpose of explaining the operation of the test desk). As an example, the connect matrix in the above-mentioned EAX system consists of five matrix cards 10×5 and one matrix card 4×5 wired together to provide a 54×5 matrix, for 54 test trunks and five test circuits.

In the illustrated embodiment, the control portion for the connect matrix utilizes the TC, P and H leads, with the T, R and S leads being coupled to one of the test circuits. Again, in the illustrated embodiment, these test circuits are indicated to be a primary test, an auxiliary test, a SDR/HLR (sounder/howler), a cord 1 and a cord 2. While these test circuits are generally indicated, it will be appreciated that other types of test circuits could as well be provided.

Figure 3A:
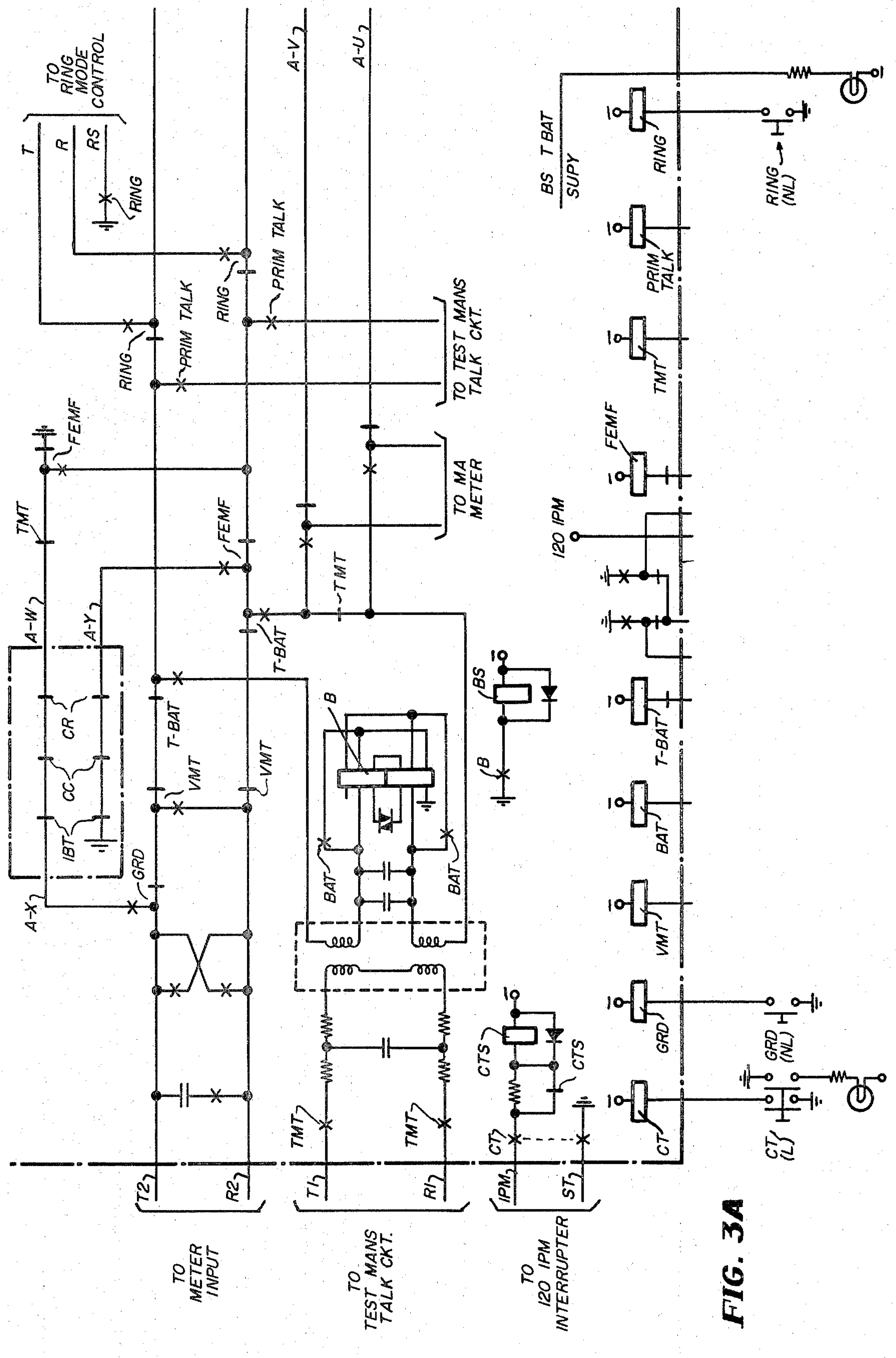
FIGS. 3A and 3B are schematics generally illustrating the primary test facility or circuit connectable through the connect matrix to a selected test trunk.
Figure 3B:
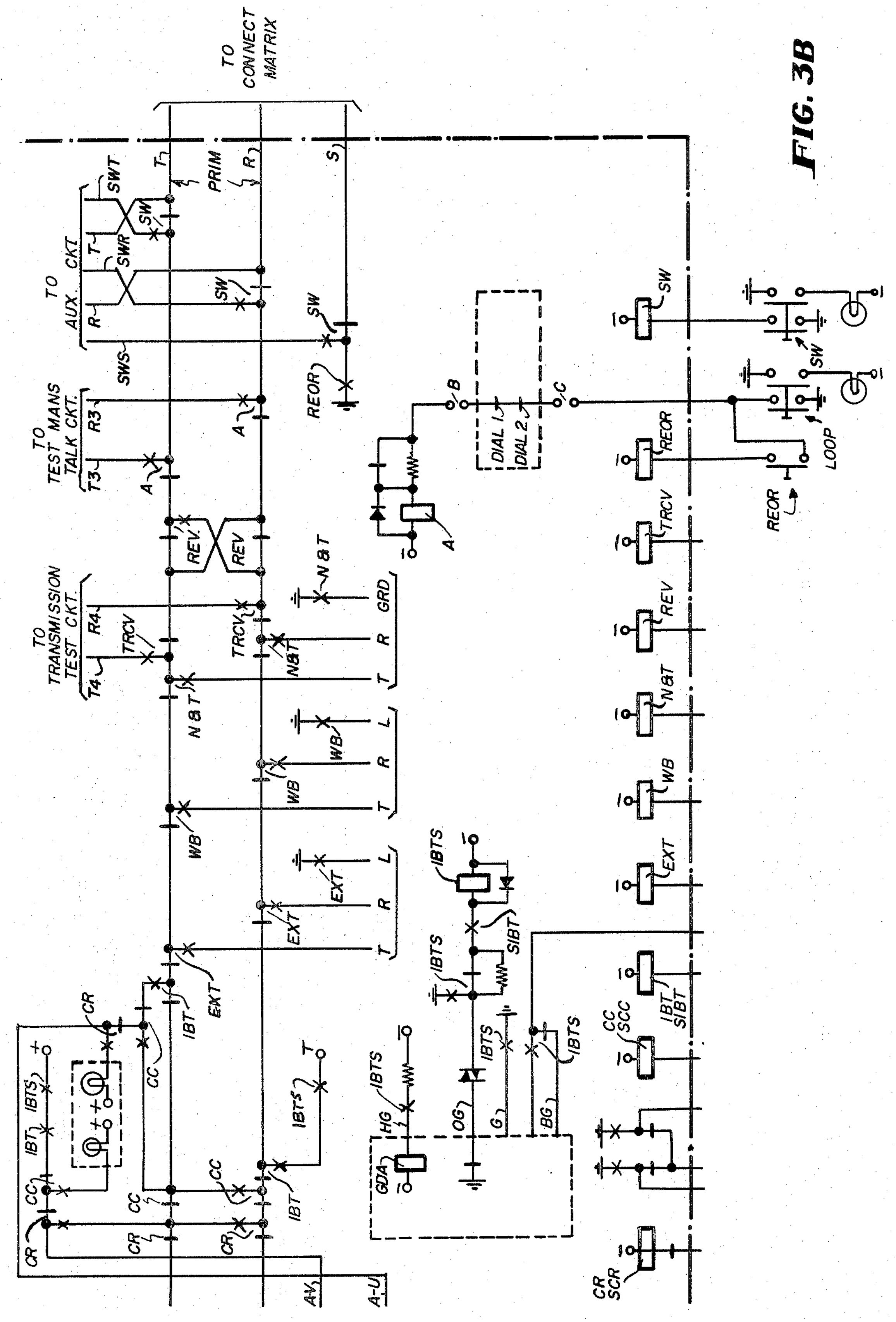
Figure 4:
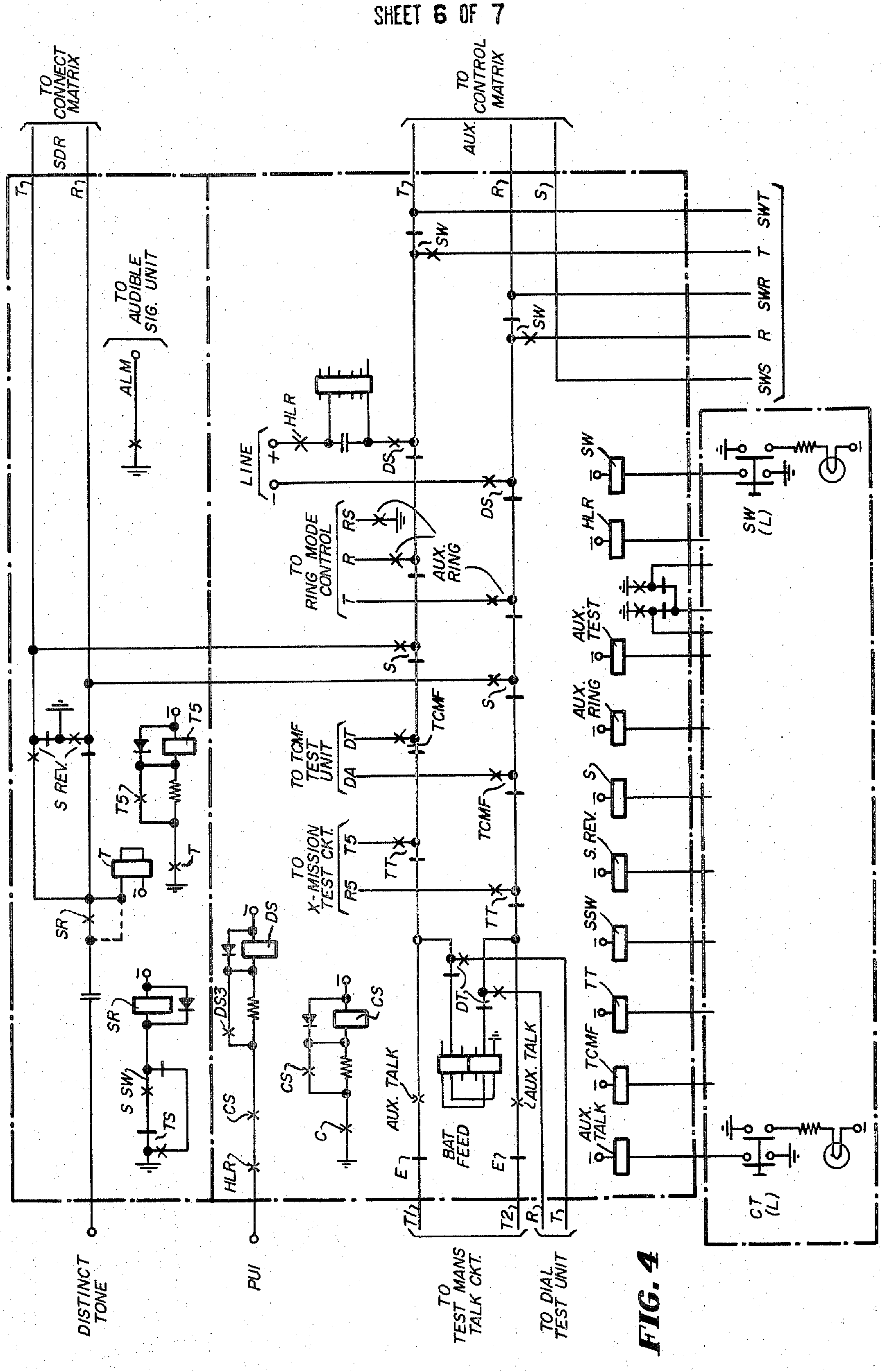
FIG. 4 is a schematic generally illustrating the auxiliary test facility or circuit connectable through the connect matrix to a selected test trunk.

An exemplary primary test circuit is shown generally in FIG. 3, to illustrate the types of test circuits which can be provided, and the various tests which can be performed. The T, R and S leads, as indicated above, are coupled together at the inlet side of the connect matrix and, in FIG. 3, can be seen to include contacts SW which permits a switch over function, whereby this primary test circuit can be switched over to the auxiliary test circuit. A test man's talk circuit can be connected to the T and R leads, via the contacts A. A transmission test circuit likewise can be connected to the T and R leads, via the contacts TRCV. The contacts IBT permit an insulation breakdown test unit to be connected, and the CC and CR contacts permit coin collect and coin refund voltages to be connected, for performing the related tests. Ringing, voltmeter tests, transmission battery and other test units also can be connected, to illustrate but a few of the various tests which can be performed via the primary test circuit. The above-mentioned contacts are operated by means of the various relays shown which, in turn, are energized by operating an associated pushbutton of the front panel of the test shown in FIG. 1.

The generally illustrated auxiliary test circuit may provide means for applying howler facilities of the type used when a customer leaves the receiver off-hook. It may also permit a customer's touch calling telephone to be tested, as well as numerous other tests. The auxiliary test circuit, for example, provides a test man with an ability to make tests that are rather time consuming, whereas the primary test circuit is used for tests that are rather quick.

The generally illustrated SDR/HLR, for example, may permit a sounder facility to be connected to a cable pair, whereby when a test man encounters a faulty cable pair he can connect the sounder facility to send out a tone for a test man at a remote position to detect the proper cable pair having the fault condition.

The generally illustrated cord 1 and cord 2 test circuits are provided, to permit a test man to make regular outgoing calls from the test desk to receive calls and extend them to telephone company personnel performing services at the subscriber's premises. These circuits are not used for any particular type of testing, except to provide the test man with a communication facility.

As to the test trunks connected to the outlet side of the connect matrix, these may include, for example, the generally illustrated CL trunk which is a communication line connected to the switching system. It serves the purpose of allowing a test man to send information into the switching system only, allowing the test man to request specific network connections (that is, busy override of a given trunk).

Figure 5:
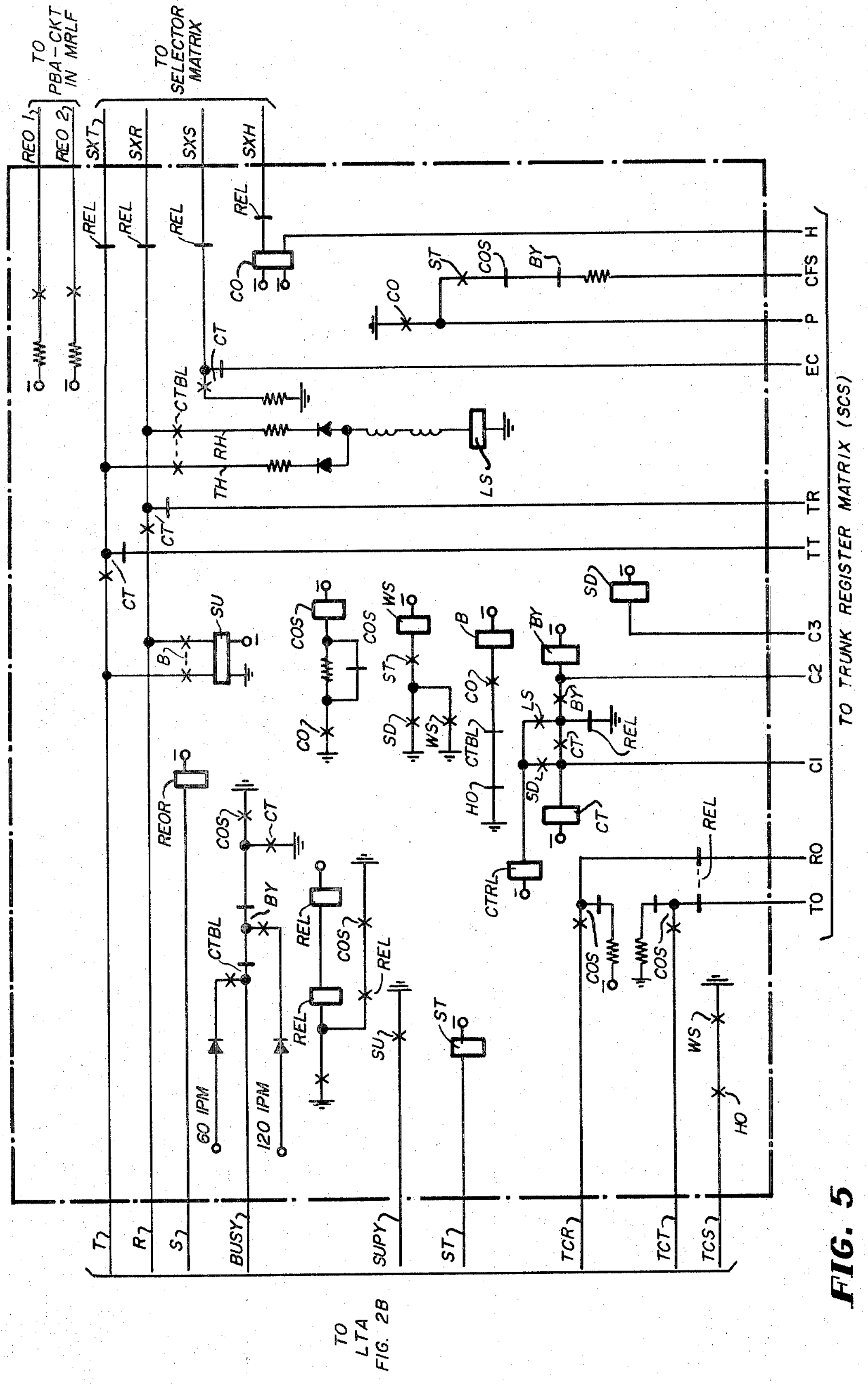
FIG. 5 is a schematic illustrating a line test access which is one of the many test trunks to which the test facilities or circuits can be connected, via the connect matrix.

The test trunks also include LTA or line test access circuits, such as the exemplary LTA circuit shown in FIG. 5, which may be connected like incoming interoffice trunks to the switching system and are given a special class of service. These calls are processed like any other call, except that the LTA trunk is given a metallic connection through the switching network to a customer's line circuit and, having a metallic connection, will allow the test man to make such tests as resistance measurements and the like. Duplicate LTA circuits generally are provided for redundancy, to permit a test man to work with one LTA circuit, while waiting for some information on another LTA circuit.

Others of the test circuits may be TTA or trunk test access circuits for accessing outgoing trunks, for performing various types of tests, such as transmission tests and supervisory tests. These TTA circuits also can be used to talk to test men in other offices, and with their assistance, make two-way transmission measurements and the like. Two such circuits generally are provided, for making two-way transmission tests via looparound facilities in other offices.

Still other types of test circuits may be, for example, lines to MDF, TTI or trunk test inlets, LTI or line test inlets, permanent trunks, toll board trunks, and repair desk trunks, all of which may be considered as exemplary of the various different test circuits with which connections can be established, via the connect matrix of FIG. 2.

To establish a connection through the connect matrix, from one of the test circuits to one of the test trunks, one of the pushbuttons PB1–PB5 is momentarily depressed. For purposes of explaining the operation, assume that pushbutton PB1 is depressed. The pushbutton PB1, like the others, is a non-locking pushbutton. When depressed, its contacts $PB1_a$ and $PB1_b$ are closed, but only the contact $PB1_b$ is functional at this time. When this contact $PB1_b$ closes, it closes an energizing circuit for the relay 1A, from the −50 volts to ground.

The relay 1A in operating closes its contacts and at its contact $1A_a$ an energizing circuit for the indicator light PB1L is closed, thus causing it to light and thereby indicate the selection of the primary test circuit. At its contact $1A_a$, the −50 volts pull potential is coupled to the P-lead of the matrix crosspoints associated with this test circuit.

Any one of the test trunks now is connected to the selected test circuit, in this case, the primary test circuit, by depressing the pushbutton associated with it. For example, in connecting the first one of the LTA circuits, its pushbutton is depressed to close its contact TPB2, to cause application of operating potential to the P-lead, which causes one of the crosspoint relays, in this case, the crosspoint relay CPR1, of the connect matrix to operate.

As soon as the crosspoint relay CPR1 has operated, its H-lead contact causes the associated B-relay 1B and the associated H-relay 1H to operate, and the crosspoint relay CPR1 to be held. It may be noted that the relays 1B and 1H exercise pull potential control by removing the pull potential from the connect matrix, at the contact $1B_a$ of relay 1B and the contact $1H_a$ of relay 1H, thereby preventing double connections.

The relay 1B in operating, at its contact $1B_b$, extends operating potential to the indicator light TCL1 associated with the LTA circuit, via the lead TC and a separate matrix crosspoint. The indicator light TCL1 will be illuminated dim, to indicate that it is in use.

Tracing a connection is performed by depressing, and holding depressed, one of the pushbuttons PB1–PB5 associated with the test circuits. This will cause 120 IPM ground pulses to be applied to the associated TC lead. The flashing ground, via a matrix crosspoint contact, will cause the indicator light associated with the test trunk connected to it to flash bright. For example, when the pushbutton PB1 is held depressed, at its contact $PB1_c$, the operating potential previously extended to the TC lead is removed and, at its contact $PB1_a$, the 120 IPM ground pulses are coupled to the TC lead, to the indicator lamp TCL1 to cause it to flash bright. Connections can be easily and quickly traced in this fashion. When the pushbutton is released, the flashing stops and the indicator lamp again lights dimly.

The availability of a test trunk is easily established, merely by observing the indicator lamps associated with them. When an indicator lamp is dimly illuminated, the circuit is in use.

Five simultaneous connections can be established through the connect matrix. Each time a selection of a test circuit is made, its associated indicator lamp lights bright. When the selected test circuit is connected to a test trunk, via the connect matrix, the indicator lamp associated with the test circuit remains bright, until the pushbutton associated with another test circuit is depressed. The indicator lamp associated with the first selected test circuit goes dim, and the one associated with the last operated test circuit goes bright.

As an example, assume that the primary test circuit has been connected with the LTA circuit, as described above. Its indicator lamp PB1L is brightly lighted, via the ground through contact $1A_a$ of relay 1A. If now the pushbutton PB2 associated with the auxiliary test circuit is depressed, for example, a connection is prepared in the manner previously described and, at its contact $PB2_b$, an energizing circuit for operating the relay 2A is closed, thus operating relay 2A. At the contact $2A_a$ of relay 2A, ground is extended to brightly light the indicator lamp PB2L. At the contact $PB2_c$ of pushbutton PB2, the energizing circuit for the relay 1A is opened, thus causing relay 1A to restore. The connection previously established when relay 1A was operated is still held by the holding potential on the H-lead. However, at its contact $1A_a$ the ground is removed so that the indicator lamp PB1L is held energized by the resistance ground through the contact $1B_c$, so that the indicator lamp PB1L is dimly illuminated.

Each of the five connections is established in the manner described above, by first operating one of the pushbuttons PB1-PB5 associated with the test circuits and by then operating one of the pushbuttons TPB associated with an idle test trunk. The indicator lamp associated with the last selected test circuit will glow brightly, while the indicator lamps associated with the other previously selected test circuits will glow dim. Any of the established connections can be easily traced, simply by holding depressed one of the pushbuttons and observing which of the indicator lamps associated with the test trunks is caused to flash brightly.

The connections are released by momentarily depressing the pushbuttons PB1 RLS – PB5 RLS associated with each of the test circuits, to remove the hold potential on the H-leads and the hold potentials for the relays 1A-5A. Correspondingly a test trunk is released by operating one of the pushbuttons REL, to remove the hold potential at the H relay.

While it is preferred to use pushbuttons, as described, it will be appreciated that other similar manually operable switch means can be used in place of pushbuttons.

Accordingly, when the term pushbuttons is used, the term is intended in a generic sense to also include these other manually operable switch means.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by letters Patent is:

1. An arrangement for connecting any one of a plurality of test circuits to any one of a plurality of test trunks comprising, in combination: a connect matrix of the crosspoint relay type having a plurality of matrix crosspoints, each of which comprises a crosspoint relay having a plurality of matrix contacts for establishing connections between the input and output leads thereof, pull leads to which pull potentials are applied to operate said crosspoint relays and hold leads to which hold potentials are applied to hold said crosspoint relays operated; said test circuits and said test trunks being connected to said input leads and said output leads, respectively; and manually operated access control means for establishing a connection between one of said plurality of test circuits and one of said plurality of test trunks comprising a plurality of first pushbuttons, each of which is associated with one of said test circuits, a plurality of select relays, each of which is associated with one of said first pushbuttons and operated therewith to couple a pull potential to the pull lead of the input to which said test circuit associated with said pushbutton is connected and to the crosspoint relays connected therewith, a plurality of second pushbuttons, each of which is associated with one of said test trunks, said second pushbuttons upon being operated applying an operating potential to the pull lead of the output to which its associated test trunk is connected to operate one of the crosspoint relays and thereupon applying a hold potential to its associated hold lead to hold said crosspoint relay operated, whereby a connection through said connect matrix from a test circuit to a test trunk is established simply by operating the respective first and second pushbuttons associated with them.

2. The arrangement of claim 1, further including an indicator lamp associated with each of said test circuits and energized when said select relay associated with a test circuit is operated, to thereby indicate said test circuit is in use.

3. The arrangement of claim 1, further including a plurality of first relays, each of which is associated with one of said test circuits and is connected to the hold lead of the input to which said test circuits is connected, a plurality of second relays, each of which is associated with one of said test trunks and is connected to the hold lead of the output to which said test trunk is connected, said first and second relays being operated when a crosspoint relay is operated and applies a hold potential to its associated hold leads, said first and second relays in operating removing the pull potential from the pull lead associated with the operated crosspoint relay, to thereby prevent double connections from being established.

4. The arrangement of claim 3, further including an indicator lamp associated with each of said test trunks, said indicator lamp being energized when said test trunk is selected and coupled with a test circuit when said first relay associated with said test circuit is operated.

5. The arrangement of claim 4, further including an interrupted source of power, said interrupted source of power being connected to an indicator lamp associated with a test trunk when the pushbutton associated with the test circuit connected to said test trunk is operated to cause said test trunk's indicator lamp to flash, whereby the connection between any one of said test circuits and a test trunk can be traced simply by operating its associated pushbutton and observing which test trunk indicator lamp flashes.

6. The arrangement of claim 1, wherein said pushbuttons and said select relays associated with them all are electrically interlocked such that a previously operated select relay is released upon the operation of another one of said pushbuttons.

7. The arrangement of claim 6, further including an indicator lamp associated with each of said test circuits and energized to glow brightly when said select relay associated with a test circuit is operated, to thereby indicate said test circuit is in use.

8. The arrangement of claim 7, further including a plurality of first relays, each of which is associated with one of said test circuits and is connected to the hold lead of the input to which said test circuit is connected, a plurality of second relays, each of which is associated with one of said test trunks and is connected to the hold lead of the output to which said test trunk is connected, said first and second relays being operated when a crosspoint relay is operated and applied a hold potential to its associated hold leads, said first and second relays in operating removing the pull potential from the pull lead associated with the operated crosspoint relay, to thereby prevent double connections from being established.

9. The arrangement of claim 8, wherein said first relays in operating apply a resistance ground to said indicator lamps associated with said test circuits to cause them to be dimly illuminated, an indicator lamp associated with a test circuit in use normally being energized to glow brightly by its associated select relay, said select relay upon being released when another one of said first pushbuttons is operated removing the energizing potential from said indicator lamp and the resistance ground then causing it to be dimly illuminated.

* * * * *